US012473454B2

(12) United States Patent
Blodau et al.

(10) Patent No.: US 12,473,454 B2
(45) Date of Patent: Nov. 18, 2025

(54) WATER-BASED EXTRUSION PRIMER FOR POLYETHYLENE

(71) Applicant: Henkel AG & Co. KGaA, Duesseldorf (DE)

(72) Inventors: Marcel Blodau, Krefeld (DE); Hans-Georg Kinzelmann, Pulheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 493 days.

(21) Appl. No.: 17/445,237

(22) Filed: Aug. 17, 2021

(65) Prior Publication Data

US 2021/0371699 A1  Dec. 2, 2021

Related U.S. Application Data

(63) Continuation of application No. PCT/EP2020/052178, filed on Jan. 29, 2020.

(30) Foreign Application Priority Data

Feb. 21, 2019  (EP) .................... 19158457

(51) Int. Cl.
  *B32B 37/06*  (2006.01)
  *B05D 7/00*  (2006.01)
  *B29C 65/00*  (2006.01)
  *B32B 15/085*  (2006.01)
  *B32B 37/15*  (2006.01)
  *B32B 38/00*  (2006.01)
  *C09D 179/02*  (2006.01)
  *C23C 22/05*  (2006.01)
  *B05D 7/14*  (2006.01)
  *B32B 37/24*  (2006.01)

(52) U.S. Cl.
  CPC ........... *C09D 179/02* (2013.01); *B05D 7/544* (2013.01); *B29C 66/7392* (2013.01); *B32B 15/085* (2013.01); *B32B 37/06* (2013.01); *B32B 37/15* (2013.01); *B32B 38/164* (2013.01); *C23C 22/05* (2013.01); *B05D 7/14* (2013.01); *B05D 2202/25* (2013.01); *B32B 2037/243* (2013.01); *B32B 2309/02* (2013.01); *B32B 2309/04* (2013.01); *B32B 2310/14* (2013.01); *B32B 2323/00* (2013.01); *B32B 2367/00* (2013.01); *B32B 2377/00* (2013.01)

(58) Field of Classification Search
CPC ... B32B 37/15; B32B 15/085; B32B 2255/04; B32B 2255/26; B05D 2505/00; B05D 7/544; C23C 22/05; C09D 179/02; B29C 66/7392
See application file for complete search history.

(56) References Cited

U.S. PATENT DOCUMENTS

| 4,407,899 | A  | * | 10/1983 | Hara ........................ C25D 5/50 |
| | | | | 428/629 |
| 7,740,790 | B2 | * | 6/2010 | Onodera ................. B29C 71/02 |
| | | | | 156/272.2 |
| 2005/0126427 | A1 | * | 6/2005 | Gonzalez ............. C09D 161/14 |
| | | | | 427/435 |
| 2005/0150589 | A1 | * | 7/2005 | Amos ................... B29C 39/148 |
| | | | | 156/209 |
| 2006/0110617 | A1 | * | 5/2006 | Kitaike ................. C08F 265/06 |
| | | | | 428/522 |
| 2012/0064293 | A1 | * | 3/2012 | Siemen ................ B32B 37/153 |
| | | | | 427/302 |
| 2013/0130021 | A1 | * | 5/2013 | Lundgard ............... B32B 15/09 |
| | | | | 524/584 |
| 2016/0229156 | A1 | | 8/2016 | Zhong et al. |
| 2019/0292402 | A1 | * | 9/2019 | Vonk ........................ C23C 22/07 |
| 2019/0292665 | A1 | * | 9/2019 | Vonk ........................ C23C 22/56 |
| 2019/0301023 | A1 | * | 10/2019 | Rector .................... C23C 22/56 |
| 2020/0131398 | A1 | * | 4/2020 | Naito .................... C09D 171/12 |

FOREIGN PATENT DOCUMENTS

| JP | S58162682 A | 9/1983 |
| RU | 2120454 C1 | 10/1998 |
| RU | 2550185 C2 | 5/2015 |
| WO | 9419187 A1 | 9/1994 |
| WO | 2011006065 A1 | 1/2011 |
| WO | 2015011686 A1 | 1/2015 |
| WO | 2018119368 A1 | 6/2018 |
| WO | 2018119373 A1 | 6/2018 |
| WO | 2018119376 A1 | 8/2018 |
| WO | 2019198024 A1 | 10/2019 |

OTHER PUBLICATIONS

International Search Report for PCT/EP2020/052178 mailed Mar. 27, 2020.

* cited by examiner

*Primary Examiner* — Scott W Dodds
(74) *Attorney, Agent, or Firm* — Mary K. Cameron

(57) ABSTRACT

The invention relates to a method of manufacturing a multilayer laminate, the multilayer laminate obtained by the method according to the invention and to forming an extrusion primer for making the multilayer laminate using an aqueous coating composition comprising at least one specific copolymer.

17 Claims, No Drawings

WATER-BASED EXTRUSION PRIMER FOR POLYETHYLENE

The invention relates to a method of manufacturing a multilayer laminate, comprising or consisting of the steps: (i) providing a metal, polyethylene terephthalate, polypropylene or polyamide substrate; (ii) applying an aqueous coating composition comprising at least one copolymer obtained by reacting at least one compound which is catechol or a derivative thereof with at least one polyethyleneimine, onto the surface of the metal, polyethylene terephthalate, polypropylene or polyamide substrate; (iii) subsequently drying for up to 10 minutes in order to obtain a coating layer; then (iv) applying a polyolefin melt or polyolefin film onto the coating layer; and (v) applying pressure in order to obtain the multilayer laminate. Additionally, the invention is directed to a multilayer laminate obtained by the method according to the invention and to the use of a specific aqueous coating composition comprising at least one specific copolymer as extrusion primer.

State of the art primer for inline extrusion are based on polymers with a certain tackiness. Substrates with tacky surfaces cannot be further rewound and need to be further processed inline. Furthermore, a high application weight of 0.2 to 1 g/m$^2$ is needed to reach acceptable adhesion values. Well-known extrusion primers are, for example, aqueous polyurethane dispersions.

Further known extrusion primers for bonding of metal surfaces and polyolefin layers are, for example, isocyanate-containing polymers, which are solved in organic solvents, e.g. ethyl acetate. Besides their tackiness after solvent evaporation, these polymers have the disadvantage of organic solvent release over time and are health damaging.

Other known, comparable extrusion primers show no adhesion on metal surfaces, especially on aluminum surfaces and are only suitable for organic substrates, e.g. polyethylene terephthalate (PET) or oriented polyamide (oPA).

Therefore, there is a need in the art for tack-free, harmless to health, water-based metal primers for converters in the film, foil, and flexible packaging industry which can overcome one or more of the above-mentioned drawbacks.

The object is solved by an aqueous coating composition comprising at least one copolymer obtained by reacting at least one compound which is catechol or a derivative thereof with at least one polyethyleneimine copolymer. In this regard, the inventors of the present invention surprisingly found that the at least one copolymer obtained by reacting at least one compound, which is catechol or a derivative thereof with at least one polyethyleneimine, comprised in an aqueous coating composition can be used as, preferably tack-free, metal primer for polyolefin extrusion on metal, preferably aluminum, polyethylene terephthalate, polypropylene or polyamide surfaces.

Therefore, in a first aspect, the invention relates to a method of manufacturing a multilayer laminate, comprising or consisting of the steps:
(i) providing a metal, polyethylene terephthalate, polypropylene or polyamide substrate;
(ii) applying an aqueous coating composition comprising at least one copolymer obtained by reacting at least one compound which is catechol or a derivative thereof with at least one polyethyleneimine, onto the surface of the metal, polyethylene terephthalate, polypropylene or polyamide substrate;
(iii) subsequently drying for up to 10 minutes in order to obtain a coating layer; then
(iv) applying a polyolefin melt or polyolefin film onto the coating layer; and
(v) applying pressure in order to obtain the multilayer laminate.

In a second aspect, the invention pertains to a multilayer laminate, obtainable by the method according to the invention.

Finally, in a third aspect, the invention relates to the use of an aqueous coating composition comprising at least one copolymer obtained by reacting at least one compound, which is catechol or a derivative thereof with at least one polyethyleneimine as extrusion primer.

"At least one", as used herein, relates to "one or more" and comprises 1, 2, 3, 4, 5, 6, 7, 8, 9 or more of the referenced species. "At least one", as used herein in relation to any component, refers to the number of chemically different molecules, i.e. to the number of different types of the referenced species, but not to the total number of molecules. For example, "at least one copolymer" means that at least one type of copolymer falling within the definition can be part of the aqueous coating composition, but that also two or more different copolymer types falling within this definition can be present, but does not mean that several copolymers of only one type of copolymer may be present.

Numeric values specified without decimal places refer to the full value specified with one decimal place. For example, "99%" means "99.0%", if not stated otherwise.

The expressions "approx." or "about", in conjunction with a numerical value, refer to a variance of ±10% relative to the given numerical value, preferably ±5%, more preferably ±1%, if not explicitly stated otherwise.

All percentages given herein in relation to the compositions or compounds relate to weight % (wt.-%) relative to the total weight of the respective composition or compound, if not explicitly stated otherwise.

These and other aspects, features and advantages of the invention become apparent to the person skilled in the following detailed description and claims. Each feature from one aspect of the invention can be used in any other aspect of the invention. Furthermore, the examples contained herein are intended to describe and illustrate the invention, but do not restrict it and in particular, the invention is not limited to these examples.

An aqueous coating composition as applied in step (ii) of the method according to the invention comprises, in addition to water, at least one copolymer obtained by reacting at least one compound, which is catechol or a derivative thereof with at least one polyethyleneimine. The aqueous coating composition may be in the form of a solution or a dispersion, preferably a storage-stable solution or dispersion; as used herein, the term "dispersion" preferably includes compositions in which none of the components of the composition are dissolved in an aqueous medium as well as compositions in which portions of one or more of the components of the composition are dissolved in an aqueous medium.

The at least one copolymer comprised in the aqueous coating composition is obtained by reacting at least one compound, which is catechol or a derivative thereof with at least one polyethylene imine.

The term "at least one compound, which is catechol or a derivative thereof" as used herein means an organic compound with an aromatic ring system that includes at least two hydroxyl groups positioned on adjacent carbon atoms of the aromatic ring system. Suitable catechol compounds include compounds containing at least one 1,2-dihydroxybenzene moiety, i.e., an aromatic ring with hydroxyl groups ortho to each other, wherein the aromatic ring may be substituted (at positions other than where the hydroxyl groups are located) with one or more substituents other than hydrogen. Combinations of two or more different catechol compounds may be used.

According to certain aspects of the invention, at least one compound, which is catechol or a derivative thereof, in accordance with formula (I) may be utilized:

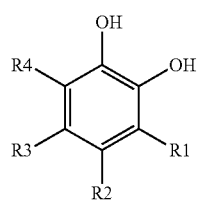

R1, R2, R3 and R4 may be the same as or different from each other and may be hydrogen or any suitable substituent that replaces hydrogen such as, for example, alkyl (e.g., C1-C12 alkyl such as methyl, ethyl, n-propyl, n-butyl and isomers thereof), alkenyl, halogen, aminoalkyl, hydroxyalkyl, carboxy, alkoxy, aryl, aroxy, nitro, sulfo groups, salts thereof and combinations thereof. In preferred embodiments of the invention, the catechol compound contains at least one amine functional group, such as a primary or secondary amine group or a salt thereof (e.g., a hydrohalide salt).

In a preferred embodiment, the catechol compound is soluble in water. For example, the catechol compound may have a solubility in water (e.g., pure neutral water) at 25° C. of at least 10 g/L, at least 50 g/L, at least 100 g/L, or even higher. In other embodiments, however, the catechol compound may be dispersible in water.

Illustratively, non-limiting examples of suitable catechol compounds include catechol, alkyl-substituted catechols (e.g., 3-methyl catechol, 4-methyl catechol, p-t-butyl catechol, 3-ethyl catechol, 3,5-di-t-butyl catechol, 3-isopropyl catechol, 4-isopropyl catechol, 4-propyl catechol, 3-propyl catechol, 4-pentyl catechol, 4-butyl catechol, 3,4-dimethyl catechol), aminoalkyl-substituted catechols and salts thereof (such as dopamine, 3,4-dihydroxy-L-phenylalanine, epinephrine, norepinephrine, α-methyldopamine, 4-(2-(ethylamino)-1-hydroxyethyl)catechol, N-isopropyl dopamine, 4-(2-aminopropyl)catechol, 3,4-dihydroxybenzylamine, N-methyl dopamine, N,N-dimethyl dopamine, 6-fluoro dopamine, dopexamine, 5-aminoethylpyrogallol, and salts thereof, including hydrohalide salts such as hydrochloride and hydrobromide salts), hydroxyalkyl-substituted catechols (e.g., 3,4-dihydroxybenzyl alcohol, 4-hydroxymethyl catechol), alkenyl-substituted catechols (e.g., 3,4-dihydroxystyrene), halo-substituted catechols (e.g., 4-chloro catechol, 4-fluoro catechol, 3-fluoro catechol, 4,5-dichloro catechol, tetrabromo catechol, tetrachloro catechol), alkoxy-substituted catechols (e.g., 3-methoxy catechol, 4-methoxy catechol), aroxy-substituted catechols (e.g., 3-phenoxy catechol), aryl-substituted catechols (e.g., 4-phenyl catechol, 3,3',4,4'-tetrahydroxybibenzyl), carboxy-substituted catechols (e.g., 3,4-dihydroxyacetophenone, 3,4-dihydroxybutyrophenone, 4-(chloroacetyl)catechol, ethyl 3,4-dihydroxybenzoate), nitro-substituted catechols (e.g., 4-nitro catechol, 3,4-dinitro catechol), sulfo-substituted catechols (e.g., 4-sulfo catechol and salts thereof), amino-substituted catechols (e.g., 4-amino catechol, and 6-amino dopamine and salts thereof, especially hydrohalide salts). Combinations of two or more different catechol compounds may be used.

In a preferred embodiment, the at least one compound, which is catechol or a derivative thereof is selected from the group consisting of dopamine, 4-(2-aminoethyl) benzene-1, 2-diol, their salts and mixtures thereof, in particular, a hydrohalide salt, such as a hydrochloride or hydrobromide salt. Most preferably, the at least one compound, which is catechol or a derivative thereof is dopamine or dopamine hydrochloride.

The at least one polyethyleneimine, preferably comprising a plurality of repeating units having the structure —[CH$_2$CH$_2$NH]—, can be linear or branched. The polyethyleneimine may have, for example, a number average molecular weight of 200 to 100,000 g/mol, preferably of 500 to 50,000 g/mol and more preferably of 800 to 25,000 g/mol (as measured by gel permeation chromatography, using polystyrene standards), although higher molecular weight polyethyleneimines (e.g., having number average molecular weights up to 2,000,000 g/mol) may also be utilized. In further embodiments, the polyethyleneimine may have a number average molecular weight of at least 100 g/mol, preferably from 100 to 200,000 g/mol, more preferably from 500 to 50,000 g/mol or more. The polyethyleneimines used according to the invention may contain one or more primary, secondary and/or tertiary amino groups. The functional groups may be substituted on aliphatic and/or aromatic carbon atoms. Modified polyethyleneimines, such as ethoxylated polyethyleneimines, are suitable for use as well.

In a preferred embodiment, the polyethyleneimine has a number average molecular weight of 200 to 100,000 g/mol, preferably of 500 to 50,000 g/mol, most preferably of 800 to 25,000 g/mol and/or is an ethoxylated polyethyleneimine.

Polyethyleneimines may be for example prepared by ring-opening polymerization of aziridine.

In preferred embodiments of the invention, the at least one polyethyleneimine is soluble in water. For example, it may have a solubility in water at 25° C. of at least 10 g/L, at least 50 g/L, at least 100 g/L or even higher. However, in other embodiments, the at least one polyethyleneimine may be dispersible in water.

One or more polyethyleneimines are reacted with one or more compounds, which are catechol or a derivative thereof to form at least one copolymer useful in the present invention.

The at least one copolymer obtained by reacting at least one compound which is catechol or a derivative thereof with at least one polyethyleneimine used in the methods of the present invention may be prepared using any suitable technique known in the art. For example, the reaction may be carried out under oxidative conditions and/or conditions effective to achieve condensation of the at least one compound which is catechol or a derivative thereof and the at least one polyethyleneimine, thereby forming a copolymeric reaction product. The precise reaction mechanisms are not well understood and the reaction products obtained are generally complex in structure. However, in at least some cases, it is believed that at least a portion of the reaction proceeds by way of Michael addition of a nucleophile (a Michael donor) in one of the reactants to an electrophilic site (a Michael acceptor) in another reactant. For example, a nucleophilic functional group of polyethyleneimine may add to the catechol compound via a Michael addition-type reaction. As another example, where the catechol compound contains a nucleophilic group such as a primary or secondary amino group, such nucleophilic group may add to the polyethyleneimine (again, by way of a Michael addition-type mechanism). Such Michael addition-type reactions typically result in the formation of covalent heteroatom-carbon bonds (e.g., nitrogen-carbon covalent bonds). However, other types of reactions resulting in the formation of covalent bonds between the reactants may also take place. Internal reaction of one or more of the reactants may also occur; for example, when the catechol compound is an aminoethyl-substituted catechol such as dopamine, cyclization of the aminoethyl group to form an indole group may be observed. Carbon-carbon and/or nitrogen-nitrogen coupling reactions may also take place.

Preferably, the at least one compound, which is catechol or a derivative thereof, the at least one polyethyleneimine and the at least one copolymer are all soluble in water. However, in other embodiments, the at least one compound, which is catechol or a derivative thereof, the at least one polyethyleneimine and/or the at least one copolymer are dispersible in water.

Exemplary methods of forming copolymers suitable for use in accordance with the present invention may comprise the following steps:
 a) forming a reaction mixture comprised of an aqueous mixture of at least one compound which is catechol or a derivative thereof and at least one polyethyleneimine; and
 b) reacting the reaction mixture under oxidative conditions (for example, conditions selected such that molecular oxygen is introduced into the reaction mixture, in the form of air or other molecular oxygen-containing gas; oxidants other than molecular oxygen may also be employed) for a time sufficient to react the at least one compound which is catechol or a derivative thereof with the at least one polyethyleneimine to form at least one copolymer; and
 c) optionally, purifying the at least one copolymer.

Oxidative conditions may be provided by introducing molecular oxygen ($O_2$) and/or other oxidants (oxidizing agents) into the reaction mixture. Suitable illustrative oxidants include, in addition to molecular oxygen, ozone, peroxide compounds (e.g., hydrogen peroxide), persulfates and the like.

Oxygen may be introduced into the reaction mixture by methods known to those skilled in the art, including by way of non-limiting example, bubbling or sparging air or oxygen into the reaction mixture, shaking or stirring the reaction mixture to introduce air bubbles and the like. Reaction conditions include maintaining a temperature in a range of about 10° C. to about 100° C., preferably in a range of 14° C. to 60° C., and more preferably about 20 to 50° C. for a period of time sufficient to form the desired quantity of the copolymer obtained by reacting at least one compound which is catechol or a derivative thereof with at least one polyethyleneimine. Higher reaction temperatures (e.g., temperatures above 100° C.) may also be employed, particularly where the reaction is carried out under pressure or in a sealed vessel. Reaction conditions generally are selected such that the reaction mixture remains liquid. Reaction time may range from 1 to 20 hours, preferably from about 3 to about 14 hours, and in one embodiment can be from 5 to 7 hours. The reaction time in other embodiments may be as little as 30 minutes, depending upon the reactivity of the at least one compound which is catechol or a derivative thereof and the at least one polyethyleneimine, the reaction temperature and pressure, and oxidant (e.g., $O_2$) availability, among other factors, provided such conditions do not negatively affect the performance of the resulting copolymer reaction product to an unacceptable extent. The at least one copolymer may be produced in a continuous synthesis process, using any of the procedures known in the polymer art; in such a process, a residence time of as little as 5 to 30 minutes may be employed.

In one embodiment, the at least one copolymer comprised in an aqueous coating composition in the method according to the invention may be prepared by a method comprising the following steps: a) providing an aqueous reactant mixture of at least one compound which is catechol or a derivative thereof (e.g., dopamine or a hydrohalide salt of dopamine) and at least one polyethyleneimine; and b) stirring the aqueous reactant mixture with vigorous vortex inducing stirring at a temperature of 20 to 50° C. for a period of time from 5 to 7 hours to thereby form at least one copolymer of the at least one compound which is catechol or a derivative thereof and at least one polyethyleneimine.

The molar ratio of the at least one compound which is catechol or a derivative thereof to at least one polyethyleneimine is not believed to be particularly critical. However, in certain embodiments, a molar ratio of the at least one catechol compound or a derivative thereof to reactive functional groups in the at least one polyethyleneimine is from 1:0.05 to 1:25 or 1:0.05 to 1:10. In one embodiment, a molar excess of reactive functional groups of the polyethyleneimine relative to the catechol compound or a derivative thereof is utilized. However, it will generally be preferred to select a molar ratio which is effective to provide at least one copolymer which is water-soluble, e.g., at least one copolymer which has a solubility in water at 25° C. of at least 0.1, at least 1, at least 5, at least 10 or at least 25% by weight.

The at least one copolymer obtained may be subjected to one or more purification steps prior to being applied in the form of an aqueous coating composition onto the surface of the metal, polyethylene terephthalate, polypropylene or polyamide substrate in accordance with the present invention. Such methods include, by way of illustration, filtration, dialysis, membrane treatment, ion exchange, chromatography and the like and combinations thereof. For example, halide salts may be formed as by-products, depending upon the reactants used to prepare the at least one copolymer. If the presence of such halide salts (chloride salts, in particular) is determined to be detrimental to the performance of the aqueous coating composition, they may be removed or reduced by any suitable method, such as treatment with an ion exchange resin capable of exchanging a less harmful anion for the halide. If unreacted compounds which are catechol or a derivative thereof and/or unreacted polyethyleneimine(s) is present, together with the at least one copolymer, such unreacted materials may, if so desired, be removed before applying the copolymer comprised in the aqueous coating composition onto the surface of the metal, polyethylene terephthalate, polypropylene or polyamide substrate. In certain embodiments of the invention, however, the aqueous coating composition when applied onto the metal, polyethylene terephthalate, polypropylene or polyamide substrate additionally is comprised of unreacted catechol compound(s) or a derivative thereof, unreacted polyethyleneimine(s), or both unreacted catechol compound(s) or derivative(s) thereof and unreacted polyethyleneimine(s) in addition to the formed copolymer. An advantage of the present invention is that aqueous coating compositions (e.g., aqueous solutions or aqueous dispersions, which preferably are storage-stable) comprising at least one copolymer obtained by reacting at least one catechol compound or a derivative thereof with at least one polyethyleneimine may be prepared in advance and conveniently stored in stable solution form until such time as it is desired to apply the formed copolymer comprised in the aqueous coating composition onto the metal, polyethylene terephthalate, polypropylene or polyamide substrate surface. Thus, forming the at least one copolymer in situ during a coating operation, which would likely lead to significant delays in processing time, is not necessary.

As used herein, the term "storage-stable" when referring to a composition (whether a solution or a dispersion) means that the composition after being stored in a sealed container over a period of observation of at least 3 months at 20° C., during which the mixture is mechanically undisturbed, exhibits no phase separation and no precipitation or settling out of any material that is visible to the unaided human eye.

According to aspects of the invention, an aqueous coating composition comprising at least one copolymer obtained by reacting at least one compound which is catechol or a derivative thereof with at least one polyethyleneimine, is applied onto a metal, polyethylene terephthalate, polypropylene or polyamide substrate. Such an aqueous coating composition (which may be in the form of a solution or a dispersion and preferably is a storage-stable composition) may be formed by any suitable method. For example, where the at least one copolymer is obtained as an aqueous dispersion or solution (as a result of carrying out the reaction of at least one compound which is catechol or derivative thereof and at least one polyethyleneimine while the reactants are dispersed or dissolved in water, for example), such an aqueous coating composition may be used directly or after dilution of the aqueous coating composition to a particular preferred end-use concentration. Water alone may be used for such dilution, but in other embodiments of the invention it is contemplated that one or more other types of components may be included in the aqueous coating composition. For example, an acid, base or buffer may be present in the aqueous coating composition to modify its pH characteristics. In several embodiment, the amount of further components in addition to the copolymer and water is preferably below 5 wt.-%, more preferably below 1 wt.-%, most preferably below 0.001 wt.-%, based on the total weight of the aqueous coating composition.

The aqueous coating composition in certain embodiments of the invention is basic, but in other embodiments may be acidic or neutral. In certain embodiments of the invention, the pH of the aqueous coating composition, when applied onto the metal, polyethylene terephthalate, polypropylene or polyamide substrate surface may be from 4.5 to 11, from 5 to 11.5, from 7 to 10.5, from 7 to 11, from 7 to 10, from 8.5 to 10, or from 8 to 10, for example.

As used (i.e., when applying the aqueous coating composition onto a metal, polyethylene terephthalate, polypropylene or polyamide substrate surface), the aqueous coating composition may have a concentration of the at least one copolymer obtained by reacting at least one compound which is catechol or a derivative thereof with at least one polyethyleneimine, of, for example, 5 to 10,000 ppm, 5 to 5000 ppm, 5 to 4000 ppm, 5 to 3000 ppm, 5 to 2000 ppm, 5 to 1500 ppm, 5 to 1000 ppm, 5 to 750 ppm or 5 to 500 ppm.

In certain embodiments, utilization of concentrates comprising water and the at least one copolymer obtained by reacting at least one compound which is catechol or a derivative thereof and at least one polyethyleneimine, is suitable, wherein the concentration of the copolymer is higher than the desired concentration of the copolymer in the aqueous coating composition applied onto the metal, polyethylene terephthalate, polypropylene or polyamide substrate surface. The concentrate may be combined with an amount of water effective to achieve such desired end-use concentration, prior to treatment of a metal, polyethylene terephthalate, polypropylene or polyamide substrate surface in accordance with the present invention.

In a preferred embodiment, the aqueous coating composition comprises the copolymer in 0.001 to 50 wt.-%, preferably 0.05 to 20 wt.-%, more preferably 0.01 to 10 wt.-%, based on the total weight of the aqueous coating composition.

In another embodiment, the aqueous coating composition contains the copolymer in 0.001 to 1.5 wt.-%, preferably 0.05 to 1.2 wt.-%, more preferably 0.01 to 1.1 wt.-%, based on the total weight of the aqueous coating composition.

In a preferred embodiment, the aqueous coating composition has a solid content of 0.0001 to 15%, preferably of 0.0005 to 2%, more preferably of 0.001 to 1.1%.

An aqueous coating composition (working bath) repeatedly applied onto metal, polyethylene terephthalate, polypropylene or polyamide substrate surfaces can, over time, become depleted with respect to the concentration of the formed copolymer. Should this happen, the aqueous coating composition in the working bath may be replenished by addition of an amount of the copolymer obtained by reacting at least one compound which is catechol or a derivative thereof with at least one polyethyleneimine (in concentrate form, for example) effective to restore the desired concentration. Furthermore, it is understood that a repeatedly used working bath containing the aqueous coating composition may accumulate some amount of various components carried over from a cleaning stage, such as alkaline builders (sodium hydroxide, potassium hydroxide, alkali metal carbonates, alkali metal bicarbonates, phosphates, silicates), surfactants and oil/grease/dirt contaminants. When the levels of such components reach a point where the performance of the working bath or the quality of the coated metal substrates being processed becomes adversely affected, the contents of the working bath may be discarded and replaced or treated to remove or reduce such components or otherwise counteract their effect (by pH adjustment and/or ion exchange, for example).

An aqueous coating composition comprising at least one copolymer obtained by reaction at least one compound which is catechol or a derivative thereof with at least one polyethyleneimine is applied onto the surface of a metal, polyethylene terephthalate, polypropylene or polyamide substrate, in accordance with the present invention. Such applying may be accomplished by any suitable method of bringing into contact, such as, for example, spraying, immersion, dipping, brushing, roll-coating or the like. Typically, the aqueous coating composition during such applying is maintained at a temperature of from ambient temperature (e.g., room temperature) to a temperature moderately above ambient temperature. For instance, the temperature of the aqueous coating composition in a working bath may be from 10 to 54° C., preferably from 16 to 49° C. or more preferably from 32 to 43° C.

The contact time should be selected to be a time sufficient to deposit an effective amount of the at least one copolymer on the metal, polyethylene terephthalate, polypropylene or polyamide substrate surface, which may generally be regarded as an amount effective to form a coating layer which is preferably able to enhance binding a metal, polyethylene terephthalate, polypropylene or polyamide substrate surface with a polyolefin layer or film. Typically, contact times of from 0.01 to 30 minutes (e.g., 0.01 seconds to 1 minute, or 0.1 seconds to 10 seconds, or 0.2 seconds to 1 second) will be suitable.

Once the desired contact time has been reached, contacting is discontinued and the treated metal, polyethylene terephthalate, polypropylene or polyamide substrate surface may be taken on to further processing steps. For example, spraying may be stopped or the article comprising the treated metal, polyethylene terephthalate, polypropylene or polyamide substrate may be removed from an immersion bath. Residual or surplus aqueous coating composition may be permitted to drain from the surface of the metal, polyethylene terephthalate, polypropylene or polyamide substrate. Removal of residual or surplus aqueous coating composition can be accomplished by any suitable method or combination of methods, such as drip-drying, squeegeeing, wiping, draining or rinsing with water. According to the invention, the treated metal, polyethylene terephthalate, polypropylene or polyamide substrate surface is dried, e.g., air-dried, heat or oven dried.

After applying the aqueous coating composition onto the surface of the metal, polyethylene terephthalate, polypropylene or polyamide substrate, the metal, polyethylene terephthalate, polypropylene or polyamide substrate is subjected to a drying step, preferably at 35 to 100° C., more preferably at 50 to 90° C., for up to 10 minutes, preferably for up to 1 minute, more preferably for up to 30 seconds, more preferably for up to 5 seconds, in order to obtain a coating layer.

In a preferred embodiment, the application weight of the coating layer is 0.001 to 0.5 $g/m^2$, preferably 0.005 to 0.1 $g/m^2$. In a preferred embodiment, the application weight of the coating layer is 0.001 to 0.1 $g/m^2$.

In a preferred embodiment, the metal substrate, onto which the aqueous coating composition is applied, is a metal film, preferably an aluminum film.

In an alternative embodiment the aqueous coating composition is applied onto a polyethylene terephthalate, polypropylene, preferably oriented polypropylene, or polyamide, preferably oriented or cast polyamide, substrate.

In another preferred embodiment, the metal substrate is a polyethylene terephthalate-aluminum metal substrate. More preferably, the metal substrate is an aluminum film, bonded to a polyethylene terephthalate layer.

In another embodiment, the metal substrate includes plastic substrates, preferably a polyethylene terephthalate substrate. Preferably this plastic substrate contains no metal fraction.

According to the invention the term "metal substrate" refers to substrates, which have a metal surface upon which the aqueous coating is applied and later brought in contact with the polyolefin film or melt. However, the metal substrate can comprise further metal or non-metal layer(s), for example a polyethylene terephthalate layer in contact with the non-coated side of the metal. In addition, according to the invention the term "polyethylene terephthalate substrate" refers to substrates, which have a polyethylene terephthalate surface upon which the aqueous coating is applied and later brought in contact with the polyolefin film or melt. However, the polyethylene terephthalate substrate can comprise further metal or non-metal layer(s), for example a metal layer in contact with the non-coated side of the polyethylene terephthalate. The same applies for polypropylene and polyamide substrates.

As used herein, the term "surface of the metal substrate" refers to the metallic surface of a metal substrate which is essentially free of any contaminants. For example, prior to applying an aqueous coating composition comprising at least one copolymer onto the surface of the metal substrate, the surface may be cleaned to remove grease, oil, dirt or other extraneous materials and contaminants using any of the cleaning procedures and materials known or conventionally used in the art, including for example mild or strong alkaline cleaners, neutral cleaners and acidic cleaners. Methods of cleaning metal surfaces are described, for example, in Murphy, "Metal Surface Treatments, Cleaning", Kirk-Othmer Encyclopedia of Chemical Technology, 2000. Aqueous as well as non-aqueous (i.e., organic solvent-based) cleaners may be employed. Components of suitable cleaners may include, for example, inorganic bases (alkali metal hydroxides, alkali metal carbonates, alkali metal bicarbonates, for example), builders (e.g., phosphates, silicates), surfactants, water, organic solvents and the like. The cleaner may be applied to and contacted with the metal substrate surface using any method known to be suitable for removing contaminants, such as spraying, immersion, wiping and so forth. The temperature during such contacting may be, for example, from about room temperature to a temperature somewhat above room temperature (e.g., 20° C. to 50° C.). The duration of the contacting between the cleaner and the metal substrate may be any time effective to achieve the desired extent of contaminant removal (for example, from 10 seconds to 5 minutes). Mechanical action may be utilized to assist in contaminant removal. While typically the cleaners used for such purpose are in liquid or solution form, it is also possible to clean metal substrate surfaces using mechanical means alone, such as sanding, sand blasting or blasting with other dry media. The metal substrate, following a cleaning step, may optionally be subjected to one or more further steps prior to being contacted with the aqueous coating composition comprising at least one copolymer obtained by reacting at least one compound which is catechol or a derivative thereof with at least one polyethyleneimine. For example, the metal substrate surface may be rinsed one or more times with water and/or an aqueous acidic solution, after cleaning.

A metal substrate surface may also be prepared by methods of forming or finishing metal articles, which result in metal surfaces being generated, such as cutting, scoring, filing, grinding, abrasion, sanding and the like.

Subsequent to a step of applying an aqueous coating composition comprising at least one copolymer obtained by reacting at least one compound which is catechol or a derivative thereof with at least one polyethyleneimine onto the surface of a metal, polyethylene terephthalate, polypropylene or polyamide substrate (ii); and after subsequently drying for up to 10 minutes in order to obtain a coating layer (iii), a polyolefin melt or polyolefin film is applied onto the coating layer (iv).

In a preferred embodiment, the polyolefin melt or polyolefin film,
  (i) is a polyethylene, polypropylene or polybutylene melt or film, preferably a polyethylene melt or film; or
  (ii) is a pretreated polyolefin film, preferably a pretreated polyethylene, polypropylene or polybutylene film.

In a preferred embodiment, the polyolefin melt or polyolefin film is treated with corona or ozone, more preferably one side of the polyolefin film or polyolefin melt is corona or ozone treated.

Afterwards, in step (v) of the method according to the invention, pressure is applied in order to obtain the multilayer laminate.

In a preferred embodiment, step (v) of the method according to the invention is carried out for up to 1 minute, more preferably for up to 30 seconds, more preferably for up to 10 seconds, most preferably for 1 second, preferably with a pressure of 50 to 900 N, more preferably of 500 to 800 N, preferably at a temperature of 100 to 250° C., more preferably at 220° C., in order to melt the polyolefin film or polyolefin melt.

Optionally, one or more post-rinsing (or "sealing") steps can be performed. Afterwards, the metal, polyethylene terephthalate, polypropylene or polyamide substrate may be subjected to one or more further processing steps, including in particular the application of a paint or other decorative and/or protective coating.

In a second aspect, the invention relates to a multilayer laminate, obtainable by the method according to the invention.

In a third aspect, the invention relates to the use of an aqueous coating composition comprising at least one copolymer obtained by reacting at least one compound, which is catechol or a derivative thereof with at least one polyethyleneimine as extrusion primer, preferably as a coating layer bonding a metal, polyethylene terephthalate, polypropylene or polyamide substrate with a polyolefin layer or film.

In a preferred embodiment of the use according to the invention, the at least one compound, which is catechol or a derivative thereof is selected from the group consisting of dopamine, 4-(2-aminoethyl)benzene-1,2-diol, their salts and mixtures thereof. Most preferably, the at least one compound is dopamine or dopamine hydrochloride.

In a further preferred embodiment of the use according to the invention, the polyethyleneimine has a number average molecular weight of 200 to 100,000 g/mol, preferably of 500 to 50,000 g/mol, most preferably of 800 to 25,000 g/mol and/or is an ethoxylated polyethyleneimine.

EXAMPLES

Example 1

General Information:

The dopamine/polyethyleneimine copolymer containing primer has a solid content of approx. 11% (Primer according to the invention).

Comparative Primer: PE extrusion primer Loctite Liofol A1883 (solid content 5% in deionized (DI) water)

Primer according to the present invention used in different concentrations:
  Primer 1: Roller coater #5 approx. 0.1 g/m$^2$ (dry) with a solid content of 1.1% in DI water.
  Primer 2: Roller coater #5 approx. 0.01 g/m$^2$ (dry) with a solid content of 0.1% in DI water.
  Primer 3: Roller coater #5 approx. 0.001 g/m$^2$ (dry) with a solid content of 0.01% in DI water.
  Primer 4: Roller coater #5 approx. 0.0001 g/m$^2$ (dry) with a solid content of 0.001% in DI water.

Application and Testing:

The primer solution (comparative primer and primer 1 to 4, respectively) was applied with a roller coater size #5 on the PET-aluminum prelaminate and the water was evaporated in oven at 90° C. for 1 minute. Then the corona treated side of the polyethylene (PE) was pressed against the coated aluminum surface with a hand roller. Due to the fact that the aluminum surface was tackfree, the polyolefin film did not stick. The resulting PET-Al/Primer/PE laminate was sealed with a Brugger machine for 1 s at 220° C. with 650 N pressure to melt the PE film. This procedure simulates the polyolefin extrusion process in the lab. At least 15 mm stripes were cut out of the laminates and the bond strength under the sealed area was measured with a tensile tester.

Results:

TABLE 1

Results of bond strength measurements using the extrusion primer for PE on PET-aluminum.

| Primer | Coating weight (dry) | Structure | Bond strength (N/15 mm) | Observations |
|---|---|---|---|---|
| Comparative Example 1 | 0.01 g/m$^2$ | PET-Alu12 µm/PE | 0.4 | no adhesion to aluminum (Al), adhesive on PE |
| Example 1 (Primer 1) | 0.1 g/m$^2$ | PET-Alu12 µm/PE | 6.8 | PE elongation and tear in sealing area. Al surface nearly tackfree, |
| Example 2 (Primer 2) | 0.01 g/m$^2$ | PET-Alu12 µm/PE | 5.4 | PE elongation and tear in sealing area. Al surface tackfree, |
| Example 3 (Primer 3) | 0.001 g/m$^2$ | PET-Alu12 µm/PE | 6.1 | PE elongation and tear in sealing area. Al surface tackfree, |
| Example 4 (Primer 4) | 0.0001 g/m$^2$ | PET-Alu12 µm/PE | 2.4 | Separation, Al surface tackfree |

The primer according to the present invention showed improved adhesion results compared to the comparative example.

Example 2

General Information:
  Primer like in example 1 were employed

Application and Testing:

The primer solution (Primer 1 and comparative primer 1 to 4, respectively) was applied with a roller coater size #5 on the PET film and the water was evaporated in oven at 90° C. for 1 minute. Then the corona treated side of the polyethylene (PE) was pressed against the coated PET surface with a hand roller. Due to the fact that the PET surface was tackfree, the polyolefin film did not stick. The resulting PET/primer/PE laminate was sealed with a Brugger machine for 1 s at 220° C. with 650 N pressure to melt the PE film. This procedure simulates the polyolefin extrusion process in the lab. At least 15 mm stripes were cut out of the laminates and the bond strength under the sealed area was measured with a tensile tester.

Results:

TABLE 2

Results of bond strength measurements, using the extrusion primer for PE on PET.

| Primer | Coating weight (dry) | Structure | Bond strength [N/15 mm] | Observations |
|---|---|---|---|---|
| Comparative Example 2 | 0.01 g/m$^2$ | PET12 µm/PE | >4 | PET tear |
| Comparative Example 3 | 0.01 g/m$^2$ | PET20 µm/PE | >4 | PE elongation and tear |

TABLE 2-continued

Results of bond strength measurements, using the extrusion primer for PE on PET.

| Primer | Coating weight (dry) | Structure | Bond strength [N/15 mm] | Observations |
|---|---|---|---|---|
| Example 5 (Primer 1) | 0.1 g/m² | PET12 µm/PE | 5.9 | PET tear |
| Example 6 (Primer 2) | 0.01 g/m² | PET12 µm/PE | 4.8 | PET tear |
| Example 7 (Primer 1) | 0.1 g/m² | PET20 µm/PE | 6.2 | PE elongation and tear |
| Example 8 (Primer 2) | 0.01 g/m² | PET20 µm/PE | 6.0 | PE elongation and tear |

The primer according to the present invention showed improved adhesion results compared to the comparative examples.

What is claimed is:

1. A method of manufacturing a multilayer laminate, comprising steps of:
   (i) providing a substrate comprising metal, polyethylene terephthalate, polyamide, polypropylene, polyamide or combinations thereof;
   (ii) applying an aqueous coating composition to at least one surface of the substrate, the aqueous coating comprising (a) at least one copolymer obtained by reacting at least one compound which is catechol or a derivative thereof with at least one polyethyleneimine and (b) water such that an amount of further components in the aqueous coating is below 5 wt.-%;
   (iii) subsequently drying the aqueous coating composition thereby forming a tack-free coating layer on the at least one surface of the substrate; then
   (iv) applying a polyolefin layer or polyolefin film onto the tack-free coating layer; and
   (v) applying pressure at 100 to 250° C. sufficient to melt the polyolefin layer or polyolefin film thereby forming a multilayer laminate;
   wherein the polyolefin layer or polyolefin film has a first surface and a second surface opposite the first surface, the first surface being corona or ozone treated and the polyolefin layer or polyolefin film being arranged such that the first surface contacts but does not adhere to the tack-free coating layer until step (v).

2. The method of claim 1, wherein the substrate is selected from oriented polyamide, cast polyamide, oriented polypropylene and combinations thereof.

3. The method of claim 1, wherein the aqueous coating composition contains the at least one copolymer in 0.01 to 1.1 wt.-%, based on total weight of the aqueous coating composition.

4. The method of claim 1, wherein the coating layer has an application weight of about 0.001 to 0.5 g/m² and the drying step (iii) is performed at 35 to 100° C., for a time of up to 10 minutes.

5. The method of claim 1, wherein the drying step (iii) is performed at 50 to 90° C., for a time of up to 1 minute.

6. The method of claim 1, wherein the substrate is a metal film.

7. The method of claim 1, wherein the substrate is an aluminum film.

8. The method according to claim 7, wherein the substrate surface comprises a polyethylene terephthalate-aluminum prelaminate and the drying step is at 90° C. for 1 minute.

9. The method of claim 1, wherein the substrate is an aluminum film, bonded to a polyethylene terephthalate layer.

10. The method of claim 1, wherein the polyolefin layer or polyolefin film is
    (i) a polyethylene, polypropylene or polybutylene layer or film; or
    (ii) a pretreated polyolefin film.

11. The method of claim 10, wherein the polyolefin melt layer or polyolefin film is a polyethylene, polypropylene or polybutylene.

12. The method according to claim 1, wherein the at least one compound, which is catechol or a derivative thereof is selected from the group consisting of 4-(2-aminoethyl)benzene-1,2-diol, their salts and mixtures thereof.

13. The method according to claim 1, wherein the at least one compound, which is catechol or a derivative thereof comprises dopamine and the polyethyleneimine has a number average molecular weight of 200 to 100,000 g/mol or is an ethoxylated polyethyleneimine.

14. The method according to claim 1, wherein the amount of further components in the aqueous coating is below 1 wt.-%.

15. The method according to claim 1, wherein the amount of further components in the aqueous coating is below 0.001 wt.-%.

16. The method according to claim 1, wherein the at least one compound which is catechol or a derivative thereof to polyethyleneimine groups of the at least one polyethyleneimine is present in amounts such that there is a respective molar ratio from 1:0.05 to 1:25.

17. The method of claim 1, wherein step (v) is applied for up to 1 minute.

* * * * *